Nov. 2, 1965    R. P. PAPENGUTH    3,215,442
FLUID SEAL

Filed April 27, 1962    2 Sheets-Sheet 1

INVENTOR.
RICHARD P. PAPENGUTH
BY
John N. Wolfram
ATTORNEY

INVENTOR.
RICHARD P. PAPENGUTH
BY
John N. Wolfram
ATTORNEY

United States Patent Office 3,215,442
Patented Nov. 2, 1965

3,215,442
FLUID SEAL
Richard P. Papenguth, Manhattan Beach, Calif., assignor to Parker-Hannifin Corporation, Cleveland, Ohio, a corporation of Ohio
Filed Apr. 27, 1962, Ser. No. 190,710
9 Claims. (Cl. 277—180)

This invention relates to sealing members adapted to be clamped between a pair of opposed elements, such as a pair of pipe flanges, and which are particularly adapted for sealing against high fluid pressures.

It is a common practice to seal the joint between a pair of pipe flanges, or other elements having opposed sealing surfaces, by clamping the flanges against a sealing member or gasket interposed therebetween. Fluid pressure within the flanges acts thereupon in a manner tending to separate the same. When high pressures and relatively large diameter fluid passages are involved the force thus tending to separate the flanges is considerable and it is necessary to provide a great number of bolts to hold the parts together. Even so, high fluid pressures may cause elongation of the bolts and/or deflection of the flanges in such a manner that the portion of the flange in sealing contact with the gasket pulls away therefrom so as to reduce the sealing pressure between the parts. If the stretch of the bolts or the deflection of the flange is great enough the flange may be completely separated from sealing contact with the gasket and a leaky joint will result.

To obtain greatest assurance against leaks in high pressure applications, the flanges are clamped against the gasket with considerable force. An ideal type of sealing member is one which has a solid metallic section for withstanding this clamping force and which includes a portion made of resilient material, such as rubber, which will easily deform itself into surface imperfections in the flanges to establish a seal. However, it is absolutely necessary that the resilient portion be completely backed up or confined by the metal portion so that there are no gaps between the metal portion and the flat faces of the flanges through which the rubber may be extruded by the high pressure fluid. Since the flange surfaces may move away from the metal portion of the gasket due to deflection thereof or due to stretching of the bolts, it is desirable that the metal back up portion automatically follow the flange surface as it pulls away so as to preclude formation of a gap through which the rubber may extrude.

It is thus an object of the present invention to provide a composite metal and rubber sealing member for sealing the joint between a pair of flat opposed surfaces in which the metal portion has a rigid section for withstanding heavy clamping pressures and has a flexible lip moveable by the rubber portion so as to maintain contact with the flange surface when the latter is separated appreciable distances from the rigid section.

It is another object to provide a sealing member of the type described in which the metal portion has a pair of flexible lips forming a groove therebetween and which groove is at all times completely filled with a part of the resilient rubber-like portion whereby deformation of the rubber-like portion will immediately act upon the lips with maximum effect for flexing the same so as to maintain their contact with the surfaces to be sealed.

It is another object to provide a composite sealing member of rubber and metal in which the metal portion has a pair of spaced flexible lips forming an annular recess therebetween and the rubber portion has a section extending into the recess for retaining the parts in assembled relation when separated from the parts to be sealed and for spreading the lips when deformed by fluid pressure.

In other forms of the invention it is an object to provide a composite sealing ring of rubber and metal in which the metal portion has flexible lips forming an annular recess therebetween, the rubber portion has a section completely filling the recess and deformable by fluid pressure for spreading the flexible lips, and there is an additional metal ring for retaining the rubber portion within the recess despite swelling and shinking of the rubber due to contact with the fluid and despite dynamic forces of the fluid as it flows.

It is another object to provide a member for sealing the joint between a pair of elements having opposed flat faces in which the sealing member comprises a rubber packing and a metal body, the packing having a portion extending initially beyond the faces of the metal body and which is deformed into line with the end faces of the metal body by the flat faces, there being another metal part for retaining the body and the retainer being so formed and dimensioned that it permits displacement of the packing when the latter is deformed into line with the end faces of the body.

Other objects of the invention will be apparent from the description and from the drawings in which.

Figure 1:
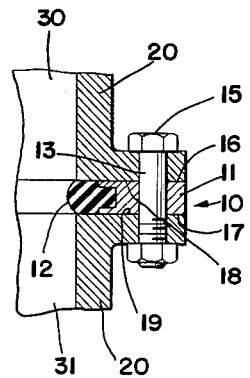
FIG. 1 is a fragmentary cross-section showing the sealing member clamped between a pair of pipe flanges.
Figure 2:
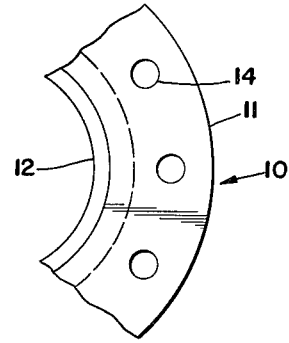
FIG. 2 is a fragmentary top view of the sealing member.

In the form of the invention disclosed in FIGS. 1 through 6, the sealing member, generally designated 10, comprises a circular body 11 of metal or other rigid material and a deformable packing 12 of resilient rubber-like material. Body 11 has a section 13 which is solid except for a plurality of holes 14 through which clamping bolts 15 may pass. The end faces 16, 17 of body 11 are flat for engagement with flat faces 18, 19 of opposed pipe flanges 20, 21.

Along its inner margin body 11 has a pair of thin flexible lips 24, 25. The lips are of uniform thickness and their outer faces 26, 27 are initially coplanar with faces 16, 17 of solid section 13. The lips are spaced so as to form a recess 28 therebetween.

Figure 3:
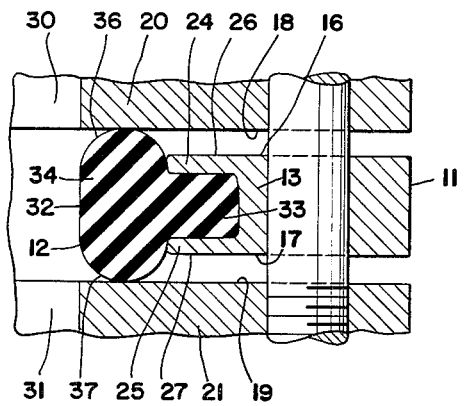
FIG. 3 is an enlarged fragmentary cross-section view showing the initial cross-section configuration of the sealing member prior to being clamped and deformed by the pipe flanges.

Packing 12 is circular so as to surround the fluid passages 30, 31 within flanges 20, 21 and has a central opening 32 through which fluid may pass. Packing 12 has a flange 33 extending into recess 28 and at all times completely filling the same. It also has a tubular part 34 located radially inward of lips 24, 25 and having rounded sealing portions 36, 37 for engaging in sealing contact with flange faces 18, 19. Portions 36, 37 initially extend axially beyond the end faces of body 11, as shown in FIG. 3. Flange 33 may be of an axial thickness about the same as the radial thickness of tubular part 34 and at least four times the thickness of lips 24, 25 to provide ample sections for distortion.

When sealing member 10 is placed between pipe flanges 20, 21 and the latter are brought together by bolts 15, sealing portions 36, 37 of packing 12 engage flange faces 18, 19 while there is still an appreciable space between flange faces 18, 19 and end faces 16, 17 of body 11. As the flanges are brought closer together, tubular part 34 of the packing resiliently deforms so as to apply sealing pressure between sealing portions 36, 37 and faces 18, 19 of the flanges. This resilient deformation is carried to some extent into flange 33 tending to expand the same axially with the result that flexible lips 24, 25 may be flexed outwardly as shown in FIG. 5 before tightening of the bolts is completed even though there is at this time no fluid pressure acting on the packing.

Figure 4:
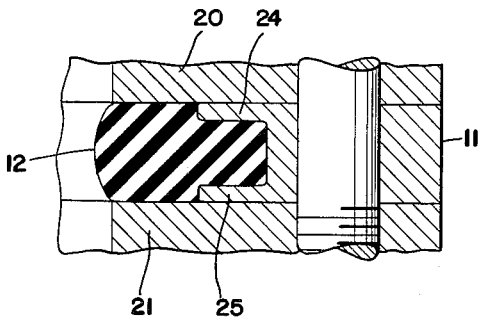
FIG. 4 is a view corresponding to FIG. 3 but in which the sealing ring is tightly clamped by the pipe flanges.

Continued tightening of bolts 15 causes flange faces 18, 19 to be brought firmly against body faces 16, 17, as shown in FIG. 4. Any spreading of lips 24, 25 has now been reversed by contact of the same with flange faces 18, 19 so that the outer faces of the lips are again co-planar with faces 16, 17 of the solid portion of body 11. Also, tubular part 34 of the packing is deformed so that surfaces 36, 37 are in tight sealing contact with flange faces 18 and 19 and are in line with the outer faces of body 11. In this position, flange 33 of the packing is also under considerable pressure tending to distort the same and urges the lips 24, 25 into tight engagement with flange faces 18 and 19 so that there is no gap therebetween into which the packing may extrude when the packing becomes subject to fluid pressure.

When fluid under pressure is introduced into the pipe flanges, it acts on the inner periphery of the packing and tends to force the same radially outwardly but, the packing is solidly backed up and retained by body 11. The fluid pressure increases the distorting pressure upon the packing so as to increase the pressure of the sealing contact between surfaces 36, 37 and flange faces 18, 19. It also increases the force with which flange 33 urges the lips 24, 25 against surfaces 18, 19.

Figure 5:
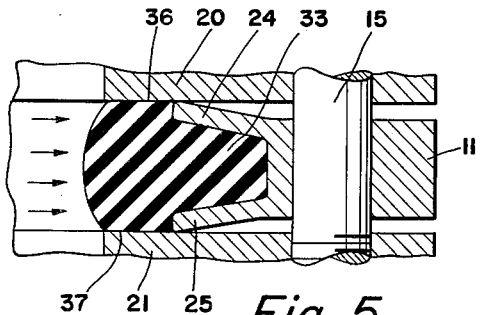
FIG. 5 is a view corresponding to FIG. 3 but in which the pipe flanges have separated somewhat due to stretching of the clamping bolts and fluid pressure within the pipe flanges has deformed the rubber portion of the sealing ring so as to spread the lips on the metal portion for maintaining contact with the flange faces.
Figure 6:
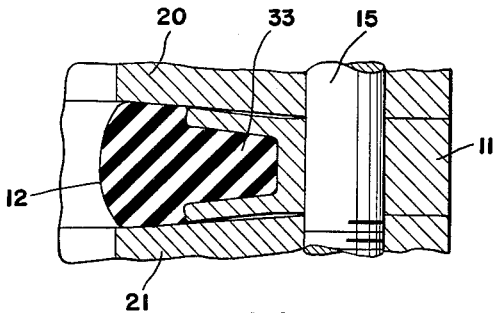
FIG. 6 is a fragmentary view similar to FIG. 3 but showing the flanges in a distorted condition.

In the event the fluid pressure within the pipe flanges becomes very high, the bolts 15 may stretch so as to permit the flanges to separate somewhat, as shown in FIG. 5, or the flanges may distort so that faces 18, 19 diverge as shown in FIG. 6. In such cases, the fluid pressure acting on the inner periphery of the packing distorts the same to expand tubular part 34 endwise to retain surfaces 36, 37 in tight sealing engagement with flange faces 18, 19. At the same time, flange 33 expands endwise to force flexible lips 24, 25 to follow flange faces 18, 19 and remain in tight contact therewith to preclude the formation of any gaps therebetween into which the packing might extrude.

Upon a lowering of the fluid pressure bolts 15 will contract, or flanges 20, 21 will resume their original shape, as the case may be, so that flange faces 18, 19 will again be brought into full contact with the end surfaces 16, 17 of body 11, as shown in FIG. 4. However, even though the elastic limit of the bolts or the flanges may have been exceeded so that the flanges do not return into complete face to face contact with the end surfaces of body 11, lips 24, 25 will remain in contact with faces 18, 19, in the manner shown in FIG. 5 due to the distorting pressure of the packing.

Figure 7:
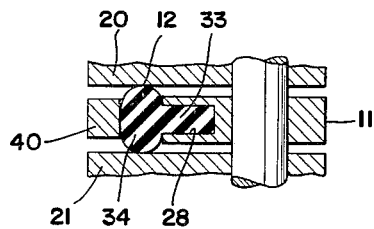
FIG. 7 is a fragmentary cross-section view of a modification which includes a metal ring for retaining the rubber packing in the recess between the flexible metal lips.
Figure 8:
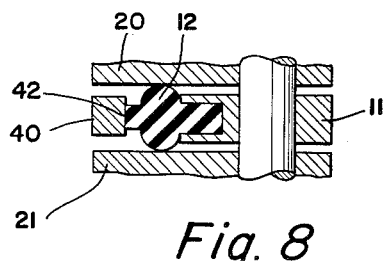
FIG. 8 is a view similar to FIG. 7 showing another optional form with a retaining ring.
Figure 9:
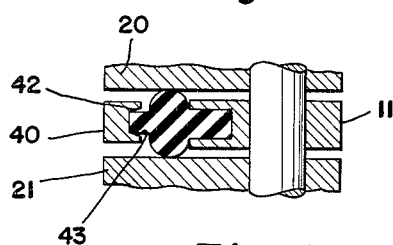
FIG. 9 is a view similar to FIG. 7 showing still another optional form utilizing a retaining ring.

The modifications shown in FIGS. 7, 8, and 9 operate in the same manner as the form shown in FIGS. 1 through 6 as far as sealing of the packing against the flange faces and as far as spreading of the lips by the packing is concerned.

In FIG. 7 retaining ring 40 is provided for maintaining flange 33 of the packing within recess 28 despite possible expansion and shrinkage of the packing due to contact with fluid, or despite dynamic effects of fluid flowing past the packing which might tend to force the packing down stream. Ring 40 is thinner than body 11 so that when the flanges are tight against retaining body 11 there will be a space on either side of ring 40 into which the material of packing 12 may distort. It will be noted that in all forms of the invention the rounding of end surfaces 36, 37 of the packing is such that as the pipe flanges are brought together the initial contact of the packing with the pipe flange is spaced radially inward of the free ends of the lips 24, 25 so that there is no pinching or extrusion of the packing material between lips 24, 25 and flange faces 18, 19.

In FIG. 8 packing 12 is provided with a radially inwardly extending rib 42 which is thinner than retaining ring 40 so as to provide additional space into which packing material may distort as the flanges are brought together.

In the form shown in FIG. 9, retaining ring 40 is provided with a groove 43 on its outer periphery for receiving inwardly extending rib 42 of the packing. Ring 40 is thus retained upon the packing so that the three parts 40, 12 and 11 are joined together and may be handled as a single piece when disassembled from the pipe flanges.

Figure 10:
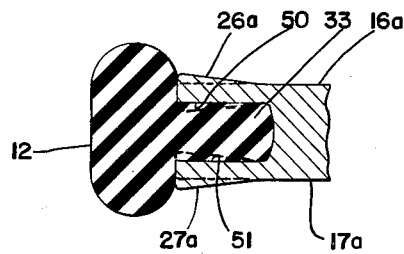
FIG. 10 is a fragmentary cross section of another optional form in which the lips are thicker at their free ends.

In other forms of the invention the lips may be initially spread so that their free ends extend axially beyond faces 16, 17. Also the lips may be of either increasing or decreasing cross section from their outer diameters toward their radially inner ends, but in which cases the flange portion 33 nevertheless is still preferably formed to initially completely fill the recess between the lips. For example, in the modification shown in FIG. 10 the lips of body 11a may initially have their axial end faces 26a, 27a tapering outwardly away from end faces 16a, 17a and their inner faces 50, 51 parallel and normal to the axis of the ring, as shown by the full lines. Forming the inner faces 50, 51 normal to the axis provides for easy machining. After inserting packing 12 into body 11a the lips may be preformed to the position shown in dotted outline, or they may be so flexed when the sealing member is clamped between the flanges it is to seal. In either case, the inner faces of the lips are then closer together at their free radially inner ends than at their outer ends to more positively retain packing flange 33 between the lips. Also, the thinner cross section of the lips toward their outer ends where most of the flexing occurs facilitates such flexing whereas the thicker cross section at the free ends of the lips gives better support for the packing against radially outward forces and avoids cutting of the packing in this area which might otherwise occur if the free ends are as thin as the outer ends.

It will be obvious that in other forms of the invention the sealing member may be in configurations other than circular and the members to be sealed may be parts other than pipe flanges, as for example, a container and closure cover therefor. It is also obvious that various other changes may be made in the parts without departing from the inventive concepts defined by the following claims.

I claim:

1. A sealing member comprising an annular rigid body having parallel axial end surfaces, a pair of flexible lip means extending radially from said body and having outer faces initially co-planar with said end surfaces, said lip means being spaced from each other so as to form a recess therebetween, a packing of deformable material having a flange means of a thickness substantially greater than said lip means extending into and filling said recess and a tubular part extending across the free ends of said lip means projecting axially therebeyond, said flange means being adapted to bend said lip means away from each other to a position axially beyond said end surfaces when fluid pressure is acting upon said packing.

2. A sealing member in accordance with claim 1 in which said lip means are of substantially uniform thickness.

3. A sealing member in accordance with claim 1 in which said recess is narrower at its open end than at its closed end.

4. A sealing member in accordance with claim 1 in which said flange means near the inner edge of said lip means is of an axial thickness at least four times as great as the axial thickness of said lip means near the inner edge thereof and substantially equal to the radial thickness of said tubular part.

5. A sealing member in accordance with claim 1 further including a retaining ring in contact with said packing for retaining said flange means within said recess, said retaining ring being axially thinner than said body.

6. A sealing member in accordance with claim 5 wherein said tubular part has a radially extending rib in contact with said retaining ring, said rib being axially thinner than said retaining ring.

7. A sealing member in accordance with claim 6 in which there is an interlocking connection between said retaining ring and said packing.

8. A sealing member in accordance with claim 7 wherein said interlocking connection includes a groove in the outer periphery of said retaining ring into which said rib is received.

9. A sealing member comprising an annular rigid body having parallel, axial end surfaces, a pair of flexible lip means extending radially from said body and having outer faces initially tapering axially away from the end faces of said body and inner faces substantially normal to the axis of said body, said lip means being spaced from each other so as to form a recess therebetween, a packing of deformable material having a flange means of a thickness substantially greater than said lip means extending into and filling said recess and a tubular part extending across the free ends of said lip means projecting axially therebeyond, said flange means being adapted to bend said lip means away from each other to a position axially beyond said end surfaces when fluid pressure is acting upon said packing.

References Cited by the Examiner

UNITED STATES PATENTS

| | | | |
|---|---|---|---|
| 2,421,659 | 6/47 | Sutton et al. | 277—207 |
| 2,599,767 | 6/52 | Long | 277—180 X |
| 2,717,793 | 9/55 | Nenzell | 277—180 |
| 3,026,367 | 3/62 | Hartwell | 174—35.2 |
| 3,093,581 | 6/63 | Pall et al. | 277—231 X |

FOREIGN PATENTS 701,614   12/53   Great Britain.

LEWIS J. LENNY, *Primary Examiner.*

SAMUEL ROTHBERG, EDWARD V. BENHAM,
*Examiners.*